United States Patent
Chen et al.

(10) Patent No.: US 10,237,291 B2
(45) Date of Patent: Mar. 19, 2019

(54) SESSION PROCESSING METHOD AND DEVICE, SERVER AND STORAGE MEDIUM

(71) Applicant: TENCENT TECHNOLOGY (SHENZHEN) COMPANY LIMITED, Shenzhen, Guangdong (CN)

(72) Inventors: Xi Chen, Shenzhen (CN); Jingtao Bai, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 140 days.

(21) Appl. No.: 15/008,243

(22) Filed: Jan. 27, 2016

(65) Prior Publication Data
US 2016/0142431 A1 May 19, 2016

Related U.S. Application Data

(63) Continuation of application No. PCT/CN2014/080593, filed on Jun. 24, 2014.

(30) Foreign Application Priority Data

Aug. 2, 2013 (CN) .......................... 2013 1 0334769

(51) Int. Cl.
*H04L 29/06* (2006.01)
*H04L 29/08* (2006.01)

(52) U.S. Cl.
CPC ...... *H04L 63/1425* (2013.01); *H04L 63/1416* (2013.01); *H04L 67/143* (2013.01); *H04L 67/22* (2013.01)

(58) Field of Classification Search
CPC ... H04L 63/1425; H04L 12/26; H04L 12/851; H04L 63/0236; H04L 47/2483;
(Continued)

(56) References Cited

U.S. PATENT DOCUMENTS 7,296,080 B2 * 11/2007 Rowley ................. H04L 41/145
370/389
7,359,983 B1 4/2008 Maufer et al.
(Continued)

FOREIGN PATENT DOCUMENTS

| CN | 1750536 A | 3/2006 |
| CN | 101383829 A | 3/2009 |

OTHER PUBLICATIONS

International Search Report and Written Opinion of the International Searching Authority for International Application No. PCT/CN2014/080593, dated Sep. 30, 2014, in 11 pages.

*Primary Examiner* — Thanhnga B Truong
(74) *Attorney, Agent, or Firm* — Knobbe Martens Olson & Bear LLP

(57) ABSTRACT

A method for processing session and a device thereof, a server and a storage medium are provided. The method includes: capturing packets sent from a client associated with the session; reconstituting a packet flow of the session from the captured packets based on quintets of the packets, wherein the quintet comprises a source address, a destination address, a source port, a destination port and a protocol number of the packet; extracting a behavior attribute of the client from the packet flow; determining that the behavior attribute of the client is beyond a baseline; and interrupting the session with the client.

9 Claims, 6 Drawing Sheets

(58) Field of Classification Search
CPC ............. H04L 61/2517; H04L 61/2539; H04L 61/255; H04L 67/06; H04L 1/00; H04L 41/142; H04L 67/22; H04L 63/1416; H04L 67/143; G06F 15/16; G06F 17/00; A61N 1/00
USPC ........ 370/252, 389, 394; 709/231, 223, 224, 709/230, 232; 726/23, 11, 22; 706/45; 607/5
See application file for complete search history.

(56) References Cited

U.S. PATENT DOCUMENTS

| | | | |
|---|---|---|---|
| 8,135,657 B2* | 3/2012 | Kapoor | G06F 9/505 706/45 |
| 9,258,277 B1* | 2/2016 | Zhuang | H04L 63/0236 |
| 2006/0107318 A1 | 5/2006 | Jeffries et al. | |
| 2013/0067574 A1 | 3/2013 | Brueckner et al. | |
| 2014/0025840 A1* | 1/2014 | Dalmia | H04L 67/06 709/232 |

* cited by examiner

SESSION PROCESSING METHOD AND DEVICE, SERVER AND STORAGE MEDIUM

The present application is a Continuation application of PCT/CN2014/080593 filed on Jun. 24, 2014 and entitled "SESSION PROCESSING METHOD AND DEVICE, SERVER AND STORAGE MEDIUM", which claims the priority to Chinese Patent Application No. 201310334769.2, entitled "SESSION PROCESSING METHOD AND DEVICE", filed on Aug. 2, 2013 with State Intellectual Property Office of People's Republic of China, which are incorporated herein by reference in entirety.

FIELD

The present disclosure relates to network security, and in particular, to a method for processing session and a device thereof, a server and a storage medium.

BACKGROUND

In a session between a server and a client, the server may receive malicious data flow or request sent from an attacker by means of manipulating the client or simulating the client. The malicious data flow or request may consume server resources and may impede the normal operation of the server. Therefore, for the security of the server, it is determined whether the server is suffering a malicious attack from statistics of the received packets based on the source addresses and destination addresses of the packets.

However, in the conventional technology, since a determination of the malicious attack is based on the statistics of the received packets, the determination is posterior to the malicious attack. Hence, the attacker has established enough null connections before the determination is completed and the capability of the server to accept new connections has already been adversely impacted.

In addition, for the clients accessing the server via Network Address Translation (NAT) or gateway, the source addresses of the different clients may be converted into a same address via a NAT or gateway device, and consequently the server is prone to misjudge the accesses from these clients as malicious attack due to the misjudgment from the source-address-based statistics.

SUMMARY

In view of this, it is to provide a method for processing session, which may avoid a hindsight determination of the malicious attack to the server and a misjudgment of the accesses from the clients for which the source addresses are converted into a same address.

In addition, it is to provide a device for processing session, which may avoid the hindsight determination of the malicious attack to the server and the misjudgment of the access from the clients for which the source addresses are converted into the same address.

A method for processing session, includes:

capturing packets sent from a client associated with the session;

reconstituting a packet flow of the session from the captured packets based on quintets of the packets, wherein the quintet comprises a source address, a destination address, a source port, a destination port and a protocol number of the packet;

extracting a behavior attribute of the client from the packet flow;

determining that the behavior attribute of the client is beyond a baseline; and interrupting the session with the client.

A device for processing a session, includes:

a capturing module, configured to capture packets sent from a client associated with the session;

a reconstitution module, configured to reconstitute a packet flow of the session from the captured packets based on quintets of the packets, wherein the quintet comprises a source address, a destination address, a source port, a destination port and a protocol number of the packet;

a flow processing module, configured to extract a behavior attribute of the client from the packet flow and determine that the behavior attribute of the client is beyond a baseline; and a session interruption module, configured to interrupt the session with the client.

By the foregoing method and device for processing session, a request initiated by a client is received and then a session with the client is created; captured packets are reconstituted based on quintets of the packets to obtain a packet flow of the session; a behavior attribute of the client is extracted from the packet flow to determine whether the behavior attribute of the client is beyond a baseline; in a case that the behavior attribute of the client is beyond the baseline, it is indicated that the session from the client is a malicious session which may result in an attack to the server, and then the session may be interrupted to avoid the upcoming attack from the client. Accordingly, the hindsight determination of the malicious attack to the server and a misjudgment of the accesses from the clients for which the source addresses are converted into a same address are avoided, and the security of the server may be guaranteed.

DETAILED DESCRIPTION

Detailed description is set forth in the following in conjunction with drawings and embodiments, to make the object, technical solutions and advantages of the disclosure better understood. It may be understood that, the embodiments described herein are only illustrative rather than limiting.

Figure 1:
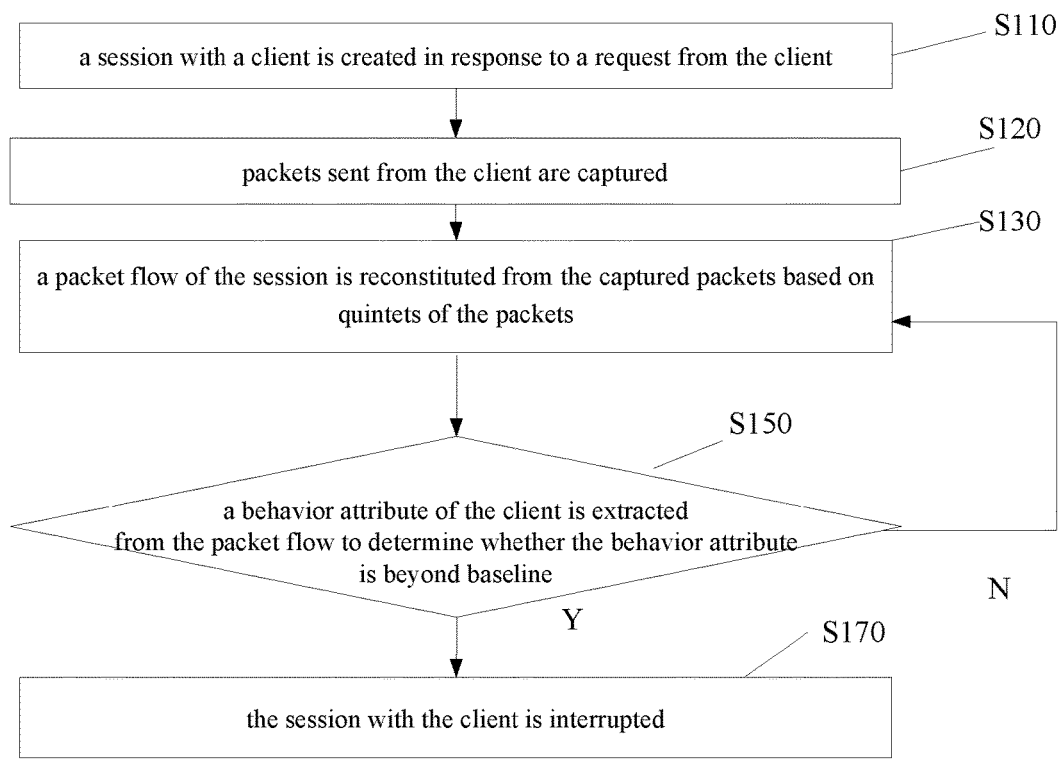
FIG. 1 is a flow chart of a method for processing a session according to an embodiment of the disclosure.

As shown in FIG. 1, a method for processing session is provided according to an embodiment, including the steps as follows.

In S110, a session with a client is created in response to a request from the client.

In this embodiment, a server may receive the client request initiated by any client, and then the session between the server and client may be created based on the request. In response to the request, three handshakes between the server and the client may be performed, and then a connection between the server and the client initiating the request may be established to create the session between the client and the server.

In S120, packets sent from the client are captured.

During the session between the server and the client, packets sent from the client are captured. The captured packets may be sent by the client for the session, or the packets may be sent by the client for another session.

In S130, a packet flow of the session is reconstituted from the captured packets based on quintets of the packets.

In this embodiment, the quintet includes a source address, a destination address, a source port, a destination port and a protocol number of the packet. The source address is a network address of the client sending the packet, the destination address is an address of a server receiving the packet, the source port is a port number allocated randomly by the client for a session in which the packet involves, the destination port indicates a port of the server for receiving the packet, and the protocol number indicates a protocol for transmitting the packet.

A session may be determined based on the quintet, i.e., the packets with a same quintet may belong to a same session. The server may capture the packets sent by the client, and then a packet flow of the session between the client and the server may be reconstituted from the captured packets based on the quintets in the packets.

In an example, the captured packets may be placed into a chain based on the quintet. Information such as the quintet is stored in a head of the chain, and packets in the chain have the quintet identical to the quintet stored in the head of chain. Each session between the server and the client corresponds to a chain.

After a packet sent by the client is captured, the quintet corresponding to the packet may be extracted from the packet to check whether there exists a chain matching the extracted quintet, and then the packet may be placed into the chain. A new chain may be created in a case that there is not chain matching the extracted quintet.

The captured packets may be grouped based on the quintet to obtain the packet flow of the session between the server and the client.

In S150, a behavior attribute of the client is extracted from the packet flow to determine whether the behavior attribute of the client is beyond a baseline. S170 may be performed in a case that the behavior attribute of the client is beyond the baseline; or the flow may return to S130 in a case that the behavior attribute of the client is not beyond the baseline.

In this embodiment, the behavior attribute of the client sending the packets is obtained from the packets in the packet flow, and then a client behavior may be detected based on the behavior attribute of the client. The behavior attribute of the client includes a time interval from a creation of the session to an initial sending of packets, a retransmission time interval of the discarded non-null packet, and an average size of previous packets.

The baseline for evaluating the client behavior is pre-configured, where the configured baseline may include a baseline time interval for evaluating the client behavior of initial sending of the first packet when creating the session, a baseline for evaluating the client behavior of retransmitting the discarded non-null packet, and a baseline for evaluating the size of the packet sent by the client. In addition, the baseline may be configured based on a requirement of operation. Furthermore, the pre-configured baseline may be measured in an ideal condition.

If it is determined that the behavior attribute of the client is beyond the baseline, it is indicated that a current client behavior is abnormal and the session corresponding to the client behavior is a malicious session, and then S170 may be performed to interrupt the malicious session, thereby avoiding a malicious attack to the server and ensuring the normal operation of the server. If it is determined that the behavior attribute of the client is not beyond the baseline, it is indicated that the current client behavior is normal and the session corresponding to the client behavior is a normal session between the server and the client; no processing is needed for the session, and the flow may return to S103 to detect the data packet captured by the server.

In S170, the session with the client is interrupted.

In this embodiment, if it is determined that the extracted behavior attribute of the client is beyond the configured baseline, it is determined that the current session is a malicious session, and the session between the server and the client corresponding to the extracted behavior attribute may be interrupted, to avoid the server resources from being occupied and the operation of the server from being affected.

In an embodiment, S170 includes: disconnecting a connection with the client and discarding the packets corresponding to the client.

In this embodiment, the client associated with the malicious session is a client being manipulated or simulated by an attacker, and then the connection between the server and the client associated with the malicious session may be interrupted, and all the packets sent by the client may be discarded.

Figure 2:
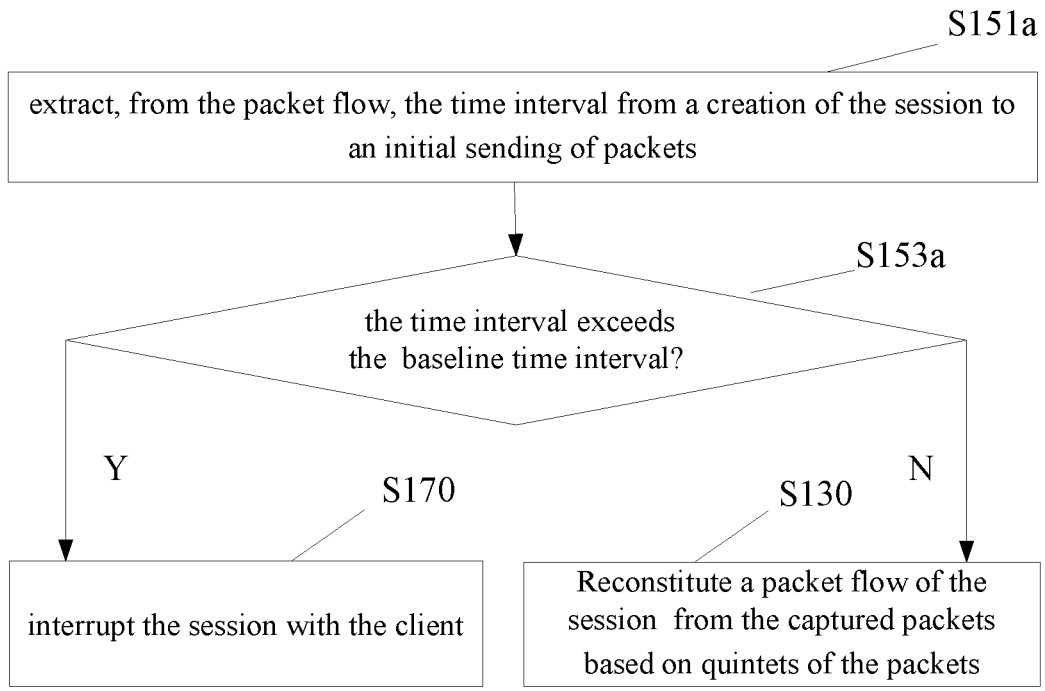
FIG. 2 is a flow chart showing a process of acquiring a behavior attribute of the client from a packet flow and determining whether the behavior attribute of the client is beyond a baseline according to an embodiment of the disclosure.

As shown in FIG. 2, in an embodiment, the step S150 includes S151a and S153a as follows.

S151a is to extract, from the packet flow, the time interval from a creation of the session to an initial sending of packets.

In this embodiment, the time interval from a creation of the session to an initial sending of packets may be obtained based on a creation time of the session recorded in the packet flow and the sending time of the first packet recorded in the packet flow.

S153a is to determine whether the time interval exceeds the corresponding baseline time interval. S170 may be performed in a case that the time interval exceeds the corresponding baseline time interval; or the flow may return to S130 in a case that the time interval does not exceed the corresponding baseline time interval.

In this embodiment, if it is determined that the time interval from a creation of the session to an initial sending of packets exceeds the configured baseline time interval, it is indicated that the session is very likely to be a malicious session, and then S170 may be performed to interrupt the session; or the flow may return to S130 to detect malicious session in a case that it is determined that the time interval from a creation of the session to an initial sending of packets does not exceed the configured baseline time interval.

Figure 3:
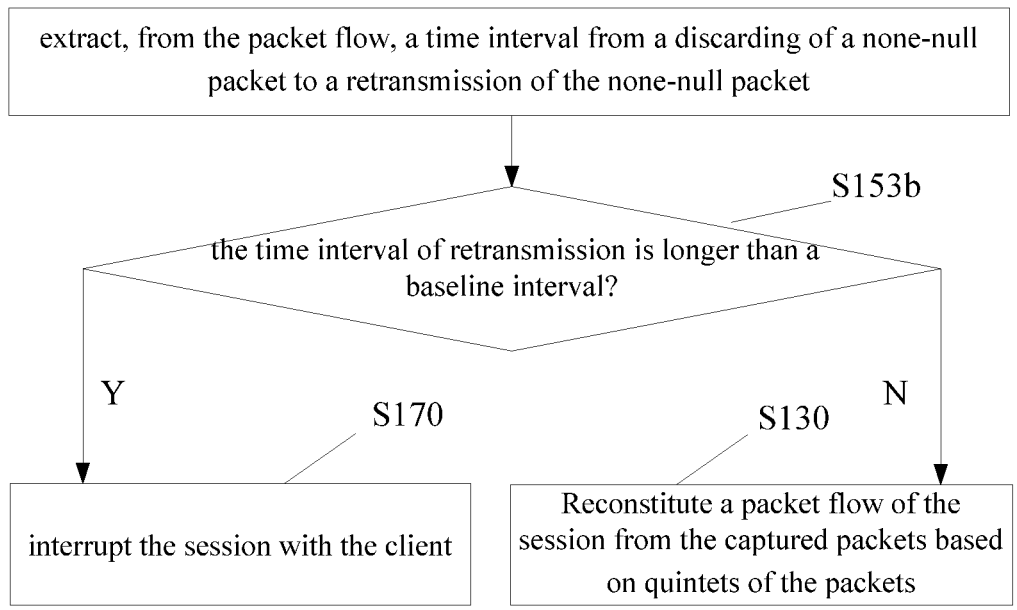
FIG. 3 is a flow chart showing a process of acquiring a behavior attribute of the client from a packet flow and determining whether the behavior attribute of the client is beyond a baseline according to another embodiment of the disclosure.

As shown in FIG. 3, in an embodiment, the step S150 includes S151b and S153b as follows.

S151b is to extract, from the packet flow, a time interval from a discarding of a none-null packet to a retransmission of the none-null packet.

In this embodiment, a time interval from a discarding of a none-null packet to a retransmission of the none-null packet is determined from the packet flow.

S153b is to determine whether the time interval of retransmission is longer than a baseline interval. S170 may be performed in a case that the time interval of retransmission is longer than the baseline interval; or the flow may return to S130 in a case that the time interval of retransmission is not longer than the baseline interval.

In this embodiment, it is to determine, based on the pre-configured baseline, whether the time interval of retransmission is longer than the baseline interval. It is indicated that the session including the packets may be a malicious session in a case that the time interval of retransmission is longer than the baseline interval, and then S170 may be performed to interrupt the session, or the flow may return to S130 in a case that the time interval of retransmission is not longer than the baseline interval.

Figure 4:
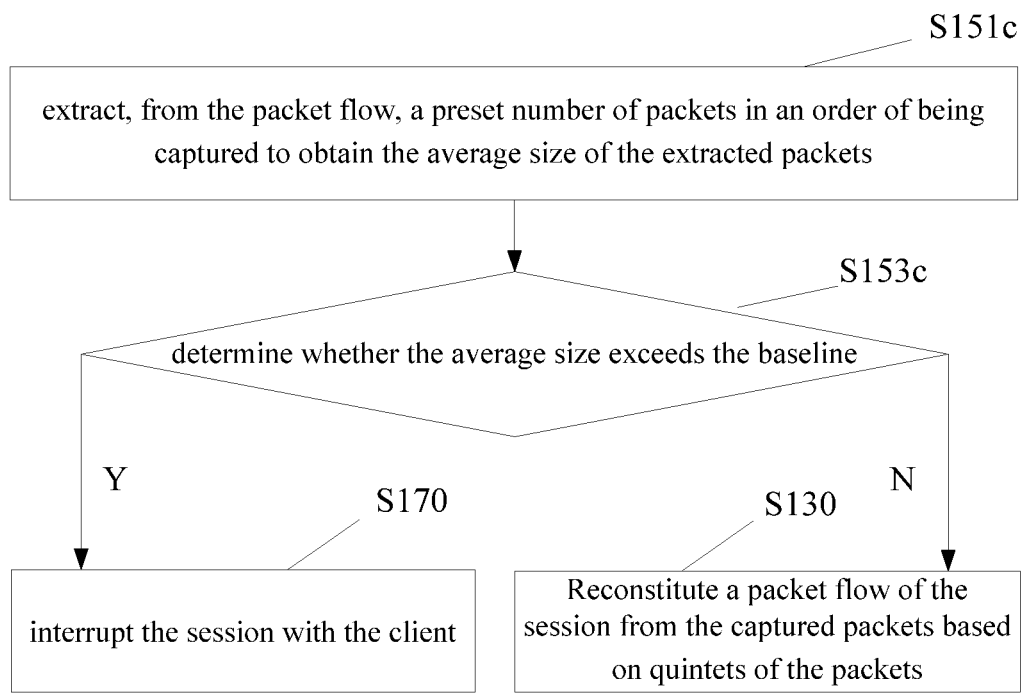
FIG. 4 is a flow chart showing a process of acquiring a behavior attribute of the client from a packet flow and determining whether the behavior attribute of the client is beyond a baseline according to another embodiment of the disclosure.

As shown in FIG. 4, in an embodiment, the step S150 includes S151c and S153c as follows.

S151c is to extract, from the packet flow, a preset number of packets in an order of being captured to obtain the average size of the extracted packets.

In this embodiment, packets in the preset number are extracted from the packet flow in an order of being captured, the sizes of the extracted packets are averaged as the average size of the extracted packets.

S153c is to determine whether the average size exceeds the baseline. S170 may be performed in a case that the average size exceeds the baseline; or the flow may return to S130 in a case that the average size does not exceed the baseline.

In this embodiment, it is to determine whether the calculated average size exceeds the configured baseline. It is indicated that the packets are abnormal in a case that the calculated average size exceeds the configured baseline, and the session is very likely to be a malicious session, therefore the session needs to be interrupted.

It may be noted that, in the process of processing the session, the determination of malicious session may be performed based on one or more behavior attributes of the client. The accuracy of the determination may increase if more types of behavior attributes are considered. In addition, the determination may be made based on other behavior attributes of the client, which may not be enumerated herein.

Figure 5:
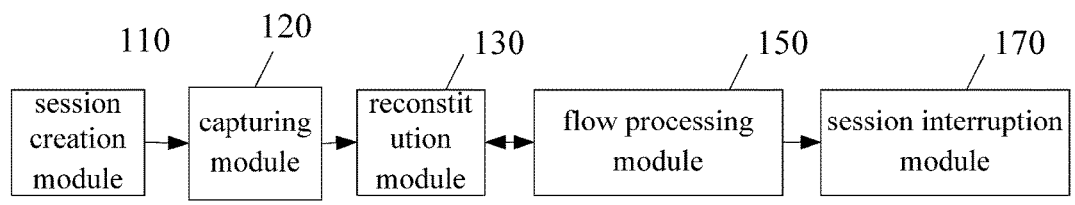
FIG. 5 is a schematic structure diagram of a device for processing a session according to an embodiment of the disclosure.

As shown in FIG. 5, a device for processing a session is provided according to an embodiment of the disclosure. The device includes a session creation module 110, a capturing module 120, a reconstitution module 130, a flow processing module 150 and a session interruption module 170.

The session creation module 110 is configured to create a session with a client in response to a request from the client.

In this embodiment, the session creation module 110 in a server may receive the client request initiated by any client, and then the session between the server and client may be created based on the client request. In response to the request, the session creation module 110 performs three handshakes between the server and the client, and then a connection between the server and the client initiating the request may be established to create the session between the client and the server.

The capturing module 120 is configured to capture the packets sent from the client.

The reconstitution module 130 is configured to reconstitute a packet flow of the session from the captured packets based on quintets of the packets.

In this embodiment, the quintet includes a source address, a destination address, a source port, a destination port and a protocol number of the packet. The source address is a network address of the client sending the packet, the destination address is an address of a server receiving the packet, the source port is a port number allocated randomly by the client for a session in which the packet involves, the destination port indicates a port of the server for receiving the packet, and the protocol number indicates a protocol for transmitting the packet.

A session may be determined based on the quintet, i.e., the packets with a same quintet may belong to a same session. The server may capture the packets sent by the client, and then a packet flow of the session between the client and the server may be reconstituted from the captured packets based on the quintets in the packets.

Furthermore, the reconstitution module 130 may placed the captured packets into a chain based on the quintet. Information such as the quintet is stored in a head of the chain, and packets in the chain have the quintet identical to the quintet stored in the head of chain. Each session between the server and the client corresponds to a chain.

After a packet sent by the client is captured, the reconstitution module 130 may extract the quintet corresponding to the packet from the packet to check whether there exists a chain matching the extracted quintet, and place the packet into the chain. A new chain may be created in a case that there is not chain matching the extracted quintet.

The reconstitution module 130 groups the captured packets based on the quintet to obtain the packet flow of the session between the server and the client.

The flow processing module 150 is configured to extract a behavior attribute of the client from the packet flow to determine whether the behavior attribute of the client is beyond a baseline. The session interruption module 170 may be informed in a case that the behavior attribute of the client is beyond the baseline; or the reconstitution module 130 may be informed in a case that the behavior attribute of the client is not beyond the baseline.

In this embodiment, the flow processing module 150 obtains, from the packets in the packet flow, the behavior attribute of the client sending the packets, and then detects a client behavior based on the behavior attribute of the client. The behavior attribute of the client includes a time interval from a creation of the session to an initial sending of packets, a retransmission time interval of the discarded non-null packet, and an average size of previous packets.

The baseline for evaluating the client behavior is pre-configured, where the configured baseline may include a baseline time interval for evaluating the client behavior of initial sending of the first packet when creating the session, a baseline for evaluating the client behavior of retransmitting the discarded non-null packet, and a baseline for evaluating the size of the packet sent by the client. In addition, the baseline may be configured based on a requirement of operation. Furthermore, the pre-configured baseline may be measured in an ideal condition.

If the flow processing module 150 determines that the behavior attribute of the client is beyond the baseline, it is indicated that a current client behavior is abnormal and the session corresponding to the client behavior is a malicious session, and then the session interruption module 170 may be informed to interrupt the malicious session, thereby avoiding a malicious attack to the server and ensuring the normal operation of the server. If the flow processing module 150 determines that the behavior attribute of the client is not beyond the baseline, it is indicated that the current client behavior is normal and the session corresponding to the client behavior is a normal session; no processing is needed for the session, and the reconstitution module 130 may be informed to detect the data packet captured by the server.

The session interruption module 170 is configured to interrupt the session with the client.

In this embodiment, if it is determined that the extracted behavior attribute of the client is beyond the configured baseline, it is determined that the current session is a malicious session, and the session interruption module 170 may interrupt the session between the server and the client corresponding to the extracted behavior attribute, to avoid the server resources from being occupied and the operation of the server from being affected.

In an embodiment, the session interruption module 170 is further configured to disconnect a connection with the client and discard the packets corresponding to the client.

In this embodiment, the client associated with the malicious session is a client being manipulated or simulated by an attacker, and then the connection between the server and the client associated with the malicious session may be interrupted, and all the packets sent by the client may be discarded.

Figure 6:
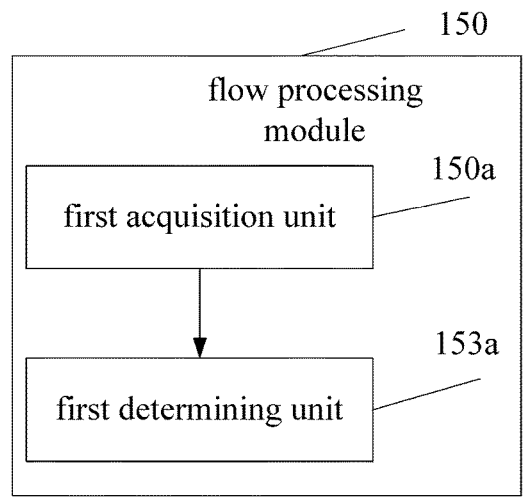
FIG. 6 is a schematic structure diagram of a flow processing module according to an embodiment of the disclosure.

As shown in FIG. 6, in an embodiment, the flow processing module 150 includes a first extracting unit 151a and a first determining unit 153a.

The first extracting unit 151a is configured to determine from the packet flow, a time interval from a creation of the session to an initial sending of packets.

In this embodiment, the first extracting unit 151a obtains the time interval from a creation of the session to an initial sending of packets based on a creation time of the session recorded in the packet flow and the sending time of the first packet recorded in the packet flow.

The first determining unit 153a is configured to determine whether the time interval exceeds the corresponding baseline time interval. The session interruption module 170 may be informed in a case that the time interval exceeds the corresponding baseline time interval; or the reconstitution module 130 may be informed in a case that the time interval does not exceed the corresponding baseline time interval.

In this embodiment, in a case that the first determining unit 153a determines that the time interval from a creation of the session to an initial sending of packets exceeds the configured baseline time interval, it is indicated that the session is very likely to be a malicious session, and then the session interruption module 170 may be informed to interrupt the session; or the reconstitution module 130 may be informed to detect the malicious session in a case that the first determining unit 153a determines that the time interval from a creation of the session to an initial sending of packets does not exceed the configured baseline time interval.

Figure 7:
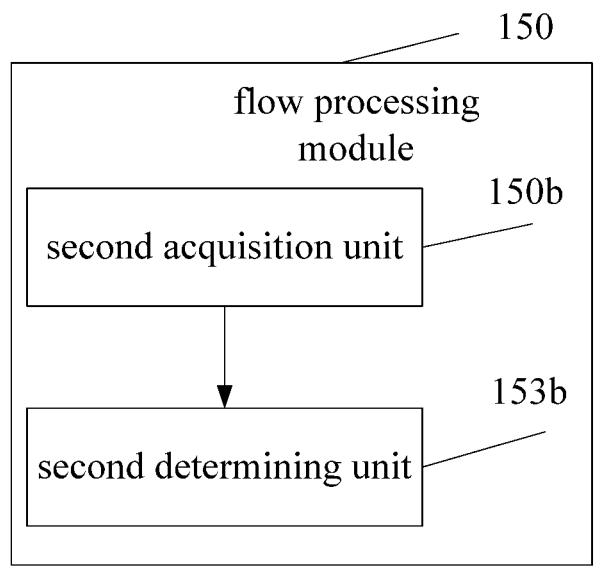
FIG. 7 is a schematic structure diagram of a flow processing module according to another embodiment of the disclosure.

As shown in FIG. 7, in an embodiment, the flow processing module 150 may include a second extracting module unit 151b and a second determining unit 153b.

The second extracting module unit 151b is configured to extract, from the packet flow, a time interval from a discarding of a none-null packet to a retransmission of the none-null packet.

In this embodiment, the second extracting module unit 151b extracts, from the packet flow, a time interval from a discarding of a none-null packet to a retransmission of the none-null packet.

The second determining module 153b is configured to determine the time interval of retransmission is longer than a baseline interval. The interruption module 170 may be informed in a case that time interval of retransmission is longer than the baseline interval; or the reconstitution module 130 may be informed in a case that time interval of retransmission is not longer than the baseline interval.

In this embodiment, the second determining module 153b determines, based on the pre-configured baseline, whether the time interval of retransmission is longer than the baseline interval. It is indicated that the session including the packet may be a malicious session in a case the second determining module 153b determines that the time interval of retransmission is longer than the baseline interval, and then the session interruption module 170 may be informed to interrupt the session; or the reconstitution module 130 may be informed to detect the malicious session in a case the second determining module 153b determines that the time interval of retransmission is not longer than the baseline interval.

Figure 8:
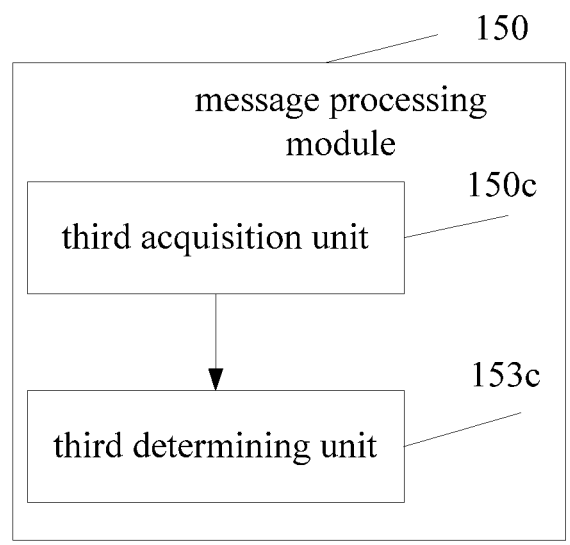
FIG. 8 is a schematic structure diagram of a flow processing module according to another embodiment of the disclosure.

As shown in FIG. 8, in an embodiment, the flow processing module 150 may include a third extracting module 151c and a third determining module 153c.

The third extracting module 151c is configured to extract, from the packet flow, a preset number of packets in an order of being captured to obtain the average size of the extracted packets.

In this embodiment, the third extracting module 151c extracts the preset number of packets from the packet flow in an order that the packets are captured, average the sizes of the extracted packets as the average size of the extracted packets.

The third determining module 153c is configured to determine whether the average size exceeds the baseline. The session interruption module may be informed in a case that the average size exceeds the baseline; or the reconstitution module 130 may be informed in a case that the average size does not exceed the baseline.

In this embodiment, the third determining module 153c determines whether the calculated average size exceeds the configured baseline. It is indicated that the packets are abnormal in a case that the calculated average size exceeds the configured baseline, and the session is very likely to be a malicious session, therefore the session needs to be interrupted.

It may be noted that, in the device for processing the session, the determination of malicious session may be performed based on one or more behavior attributes of the client. The accuracy of the determination may increase if more types of behavior attributes are considered. In addition, the determination may be made based on other behavior attributes of the client, which may not be enumerated herein.

By the foregoing method and device for processing session, a request initiated by a client is received and then a session with the client is created; captured packets are reconstituted based on quintets of the packets to obtain a packet flow of the session; a behavior attribute of the client is extracted from the packet flow to determine whether the behavior attribute of the client is beyond a baseline; in a case that the behavior attribute of the client is beyond the baseline, it is indicated that the session from the client is a malicious session which may result in an attack to the server, and then the session may be interrupted to avoid the upcoming attack from the client. Accordingly, the hindsight determination of the malicious attack to the server and a misjudgment of the accesses from the clients for which the source addresses are converted into a same address are avoided, and the security of the server may be guaranteed.

Figure 9:
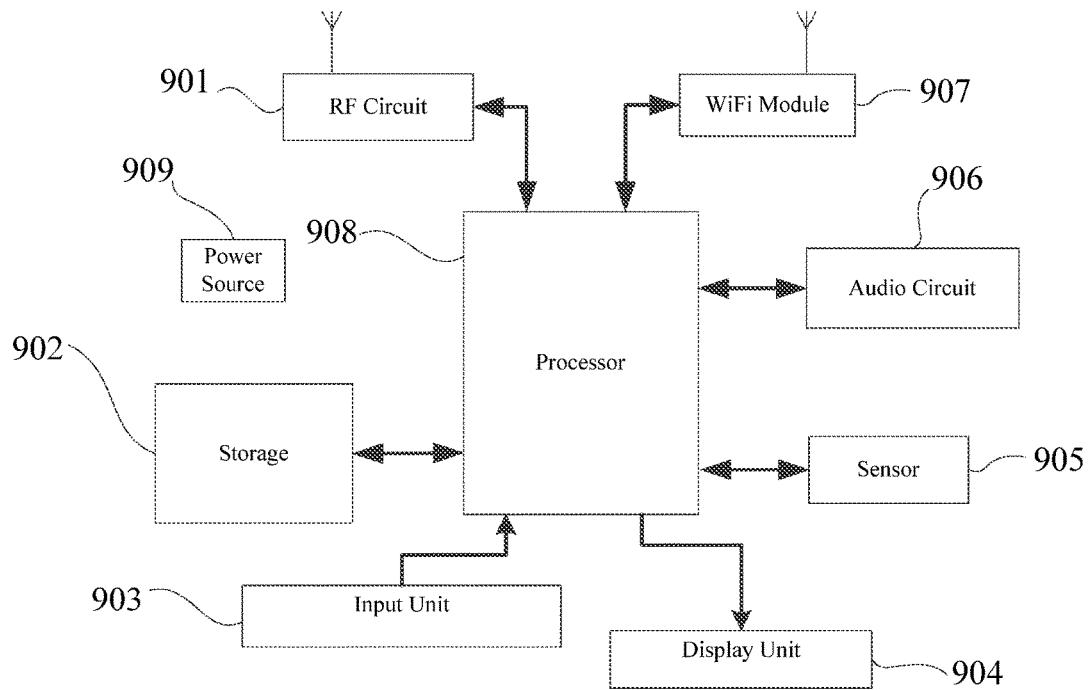
FIG. 9 is a schematic diagram showing a hardware structure of a device for processing a session according to an embodiment of the disclosure.

In one embodiment of the disclosure, the device for processing a session may be in a hardware in structure as shown in FIG. 9. The device may include: a Radio frequency (RF) circuit 901, a storage 902 including one or more computer readable storage mediums, an input unit 903, a display unit 904, a sensor 905, an audio circuit 906, a Wireless Fidelity (WiFi) module 907, a processor 908 including one or more processing cores, and a power source 909, etc. It should be understood by those skilled in the art that, a structure of the device shown in FIG. 9 is not intended to limit the device, more or less components than shown in FIG. 9 may be included in the device, some components may be combined, or the components may be in another arrangement.

The RF circuit 901 may be configured to receive and send signals during receiving and sending messages or making a phone call, and in particular, deliver downlink information of a base station to one or more processors 908 to process and send uplink data to the base station. The RF circuit 901 usually includes, but not limited to, an antenna, at least one amplifier, a tuner, one or more oscillators, a Subscriber Identity Module (SIM) card, a transceiver, a coupler, a Low Noise Amplifier (LNA), a duplexer, etc. In addition, the RF circuit 601 may communicate with a network or other devices through wireless communication. The wireless communication may be performed according to any communication standard or protocol, including but not limited to: Global System of Mobile communication (GSM), General Packet Radio Service (GPRS), Code Division Multiple Access (CDMA), Wideband Code Division Multiple Access (WCDMA), Long Term Evolution (LTE), Email, Short Messaging Service (SMS), etc.

The storage 902 may be configured to store software program(s) and module(s), the processor 608 executes various applications and data processing by running the software program(s) and module(s) stored in the storage 902. The storage 902 may mainly include program storage area and data storage area, where the program storage area may store an operating system, an application program required for at least one function (e.g., a function of playing audio, a function of displaying image, etc.), etc.; the data storage area may store data (e.g., audio data, telephone book, etc.) created based on the usage of the device, etc. In addition, the storage 902 may include a high speed random access memory, a nonvolatile storage, e.g., at least one magnetic disk storage or flash disk, and any solid volatile storage. Correspondingly, the storage 902 may include a storage controller, which is configured to enable the processor 608 and the input unit 903 to access the storage 902.

The input unit 903 may be configured to receive an input number or input character information, and implement input of a signal, which is correlated to user configuration and function control, input through a keyboard, a mouse, an operating rod, an optical input device or a trackball. According to a specific embodiment of the disclosure, the input unit 903 may include a touch-sensitive surface and any other input device. The touch-sensitive surface, also known as a touch screen or touch panel, may capture a touch operation on or nearby the surface (e.g., an operation on or near the touch-sensitive surface performed by a user with a finger, a stylus or any suitable object or accessory), and drive a corresponding connection means based on a preset program. Optionally, the touch-sensitive surface may include two components: a touch detection apparatus and a touch controller. The touch detection apparatus is configured to detect a touch position, detect the signal caused by the touch operation, and send the signal to the touch controller; the touch controller is configured to receive touch information from the touch detection apparatus, convert the touch information into coordinates of the touch position, send the coordinates to the processor 908, and receive and execute a command from the processor 908. In addition, the touch-sensitive surface may be implemented in many types, e.g., a resistance type, an infrared type, a Surface Acoustic Wave type, etc. Besides the touch-sensitive surface, the input unit 903 may include any other input device. Specifically, the any other input device includes but not limited to: any one of a physical keyboard, a function key (e.g., a key for controlling volume, an ON/OFF key, etc.), a trackball, a mouse and an operating rod or a combination thereof.

The display unit 904 is configured to display information input by the user, information provided to the user and various graphic user interfaces of the device, where those graphic user interfaces may consists of image, text, icon, video and any combination thereof. The display unit 904 may include a display panel, and optionally, the display panel may be in forms of a Liquid Crystal Display (LCD), an Organic Light-Emitting Diode (OLED), etc. Furthermore, the touch-sensitive surface may cover the display panel, after the touch operation is detected on or near the touch-sensitive surface, the touch information is sent to the processor 908 to determine the type of a touch event, and then the processor 908 provides a corresponding visual output on the display panel based on the type of the touch event. Although in FIG. 9, the touch-sensitive surface and the display panel are implemented as two independent components to achieve input and output functions, the touch-sensitive surface and the display panel may be integrated together to achieve input and output functions according to some embodiments of the disclosure.

The device may further include at least one sensor 905, e.g., an optical sensor, a motion sensor and any other sensor. Specifically, the optical sensor may include an ambient light sensor and a proximity sensor, where the ambient light sensor may adjust the brightness of the display panel based on the intensity of ambient light, and the proximity sensor may turn off the display panel and/or a backlight when the device is moved near to an ear. As one kind of the motion sensor, a gravity acceleration sensor may detect values of accelerations on all directions (usually three-axis) and detect the value and direction of the gravity when remaining stationary. The gravity acceleration sensor may be applied in an application for recognizing posture of a mobile phone (for example, switching between landscape and portrait, relevant games, magnetometer pose calibration), a function related to vibration recognition (for example, a pedometer, knocking), etc.; in addition, other sensors, e.g., a gyroscope, a barometer, a hygrometer, a thermometer, an infrared sensor, etc. may be further provided in the device, the description of which is omitted herein.

The audio circuit 906, a loudspeaker and a microphone may provide an audio interface between the user and the device. The audio circuit 906 may transmit an electric signal converted from received audio data to the loudspeaker, and a voice signal is converted from the electric signal and is output by the loudspeaker; on the other hand, the microphone converts captured voice signal into an electric signal, the electric signal is received by the audio circuit 606 and converted into audio data, the audio data is output to the processor 608 to process and then sent to, for example, another device via the RF circuit 901. Alternatively, the audio data is output to the storage 602 for further processing. The audio circuit 906 may further include a headset jack through which an external earphone and the device may be connected.

WiFi is a technology for short distance wireless transmission. With the WiFi module 907, the device may insist the user in receiving and sending an email, browsing a web page, accessing a stream media, etc., and a wireless broadband Internet access is provided to the user. Although the WiFi module 907 is shown in FIG. 9, it should be understood that the WiFi module is not indispensable in the device and may be omitted as required without changing the essence of the disclosure.

The processor 908, as a control center of the device, is connected all components of the whole mobile phone via various interfaces and wires, monitors the whole mobile phone by running or executing the software program(s) and/or module(s) stored in the storage 902, invokes the data stored in the storage 902, executes various functions of the device and processes the data. Optionally, the processor 908 may include one or more processing cores; preferably, the processor 908 may be integrated with an application processor and a modem processor, where the application processor is mainly responsive of processing involved with the operating system, the user interface, the applications, etc. and the modem processor is mainly responsive of processing involved with the wireless communication. It may be understood that, the modem processor may not be integrated in the processor 908.

The device further includes the power source 909 (such as a battery) providing power to all the components. Preferably, the power source may be connected to the processor 908 logically through a power management system in order to implement functions of charging management, discharging management, power consumption management, etc. The power source 909 may further include one or more direct-current or alternating current power sources, a recharging system, a power failure detection circuit, a power adapter or inverter, a power status indicator, etc.

The device may include, although not shown, a camera, a Bluetooth module, etc., for which the description is omitted. According to the embodiment of the disclosure, the processor 908 in the device implements various functions by loading executable files corresponding to one or more processes of an application into the storage 902 and running the application stored in the storage 902 by the processor 908. For example, the processor 908 may function as capturing packets sent from a client associated with the session; reconstituting a packet flow of the session from the captured packets based on quintets of the packets, wherein the quintet comprises a source address, a destination address, a source port, a destination port and a protocol number of the packet; extracting a behavior attribute of the client from the packet flow; determining that the behavior attribute of the client is beyond a baseline; and interrupting the session with the client.

Figure 10:
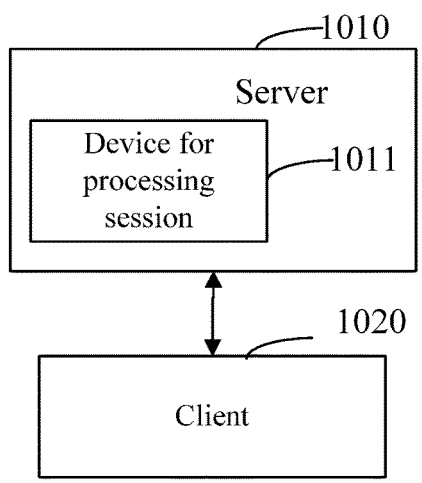
FIG. 10 is a schematic diagram showing a server conducting a session with a client according to an embodiment of the disclosure.

According to another embodiment of the disclosure, a server including the device for processing session as described above is provided. As shown in FIG. 10, the server 1010 includes a device 1011 for processing session, and the server 1010 and the client 1020 are involved in a session. The device 1011 may capture the packets sent from the client 1020, reconstitute a packet flow of the session from the captured packets based on quintets of the packets, and extract a behavior attribute of the client from the packet flow. Once it is determined that the behavior attribute of the client is beyond a baseline, the server 1010 interrupt the session with the client 1020.

It should be understood by those skilled in the art that all or some of the steps in the methods according to the embodiments of the disclosure may be performed by a corresponding hardware instructed with a program. The program may be stored in a computer readable storage medium. The computer readable storage medium may include Read Only Memory (ROM), Random Access Memory (RAM), magnetic disk, Compact Disk, etc.

Although embodiments for illustrating the implementation of the disclosure are provided with specifics and details, the embodiments are not meant to limit the scope of the disclosure. It should be noted that any changes and modifications made by those skilled in the art within the principle of the disclosure fall into the protection scope of the disclosure. Hence, the scope of the disclosure is defined by the appended claims.

The invention claimed is:

1. A method for processing a session, comprising:
   receiving, with a processor of a server, a client request initiated by a client;
   performing, with the processor, a handshake with the client in response to the request to create the session with the client;
   capturing, with the processor, packets sent from the client;
   placing, with the processor, ones of the captured packets into a chain based on source addresses, destination addresses, source ports, destination ports and protocol numbers of the captured packets, to reconstitute a packet flow of the session;
   extracting, with the processor, a time behavior attribute of the client from the packet flow;
   determining, with the processor, that the time behavior attribute of the client is beyond a baseline;
   disconnecting, with the processor, connection between the server and the client in response to the time behavior attribute of the client being beyond the baseline; and
   discarding, with the processor, the captured packets in response to the time behavior attribute of the client being beyond the baseline.

2. The method according to claim 1, wherein:
   the process of extracting the time behavior attribute of the client from the packet flow comprises determining, with the processor, according to the packet flow, a time interval from a time for creating the session to a time for beginning sending the packets; and the process of determining that the time behavior attribute of the client is beyond the baseline comprises determining that the time interval is longer than a baseline interval.

3. The method according to claim 1, wherein the process of extracting the time behavior attribute of the client from the packet flow comprises determining, with the processor, according to the packet flow, a time interval from a time for discarding a none-null packet to a time for retransmitting the none-null packet; and the process of determining that the time behavior attribute of the client is beyond the baseline comprises determining that the time interval is longer than a baseline interval.

4. A device for processing a session, comprising a memory coupled to a processor, the processor configured to execute:
- a session creation module, configured to receive a client request initiated by a client and perform a handshake with the client in response to the request to create the session with the client;
- a capturing module, configured to capture packets sent from a client associated with the session;
- a reconstitution module, configured to place ones of the captured packets into a chain based on source addresses, destination addresses, source ports, destination ports and protocol numbers of the captured packets, to reconstitute a packet flow of the session;
- a flow processing module, configured to extract a time behavior attribute of the client from the packet flow and determine that the time behavior attribute of the client is beyond a baseline; and
- a session interruption module, configured to disconnect connection between the device and the client and discard the captured packets in response to the time behavior attribute of the client being beyond the baseline.

5. The device according to claim 4, wherein the flow processing module comprises:
- a first extracting unit, configured to determine according to the packet flow, a time interval from a time for creating the session to a time for beginning sending the packets; and
- a first determining unit, configured to determine that the time interval is longer than a baseline interval and inform the session interruption module.

6. The device according to claim 4, wherein the flow processing module comprises:
- a second extracting module unit, configured to determine according to the packet flow, a time interval from a time for discarding a none-null packet to a time for retransmitting the none-null packet; and
- a second determining module, configured to determine that the time interval is longer than a baseline interval and inform the session interruption module.

7. A server comprising a device for processing a session, wherein the device comprises a memory coupled to a processor configured to execute:
- a session creation module, configured to receive a client request initiated by a client and perform a handshake with the client in response to the request to create the session with the client;
- a capturing module, configured to capture packets sent from a client associated with the session;
- a reconstitution module, configured to place ones of the captured packets into a chain based on source addresses, destination addresses, source ports, destination ports and protocol numbers of the captured packets, to reconstitute a packet flow of the session;
- a flow processing module, configured to extract a time behavior attribute of the client from the packet flow and determine that the time behavior attribute of the client is beyond a baseline; and
- a session interruption module, configured to disconnect connection between the server and the client and discard the captured packets in response to the time behavior attribute of the client being beyond the baseline.

8. The server according to claim 7, wherein the flow processing module comprises:
- a first extracting unit, configured to determine according to the packet flow, a time interval from a time for creating the session to a time for beginning sending the packets; and
- a first determining unit, configured to determine that the time interval is longer than a baseline interval and inform the session interruption module.

9. The server according to claim 7, wherein the flow processing module comprises:
- a second extracting module unit, configured to determine according to the packet flow, a time interval from a time for discarding a none-null packet to a time for retransmitting the none-null packet; and
- a second determining module, configured to determine that the time interval is longer than a baseline interval and inform the session interruption module.

* * * * *